(12) United States Patent
Lei et al.

(10) Patent No.: US 11,310,701 B2
(45) Date of Patent: Apr. 19, 2022

(54) FACILITATING FAST RETURN TO STAND ALONE ADVANCED NETWORKS AFTER VOICE FALL BACK

(71) Applicant: AT&T Intellectual Property I, L.P., Atlanta, GA (US)

(72) Inventors: Hongyan Lei, Plano, TX (US); Yonghui Tong, Alpharetta, GA (US); Yupeng Jia, Austin, TX (US); Ye Chen, Milton, GA (US); Wen Yang, Bellevue, WA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 16/867,227

(22) Filed: May 5, 2020

(65) Prior Publication Data

US 2021/0195470 A1 Jun. 24, 2021

Related U.S. Application Data

(60) Provisional application No. 62/950,461, filed on Dec. 19, 2019.

(51) Int. Cl.
*H04W 36/00* (2009.01)
*H04W 76/10* (2018.01)

(52) U.S. Cl.
CPC ....... *H04W 36/0022* (2013.01); *H04W 76/10* (2018.02)

(58) Field of Classification Search
CPC .......................... H04W 36/0022; H04W 76/10
See application file for complete search history.

(56) References Cited

U.S. PATENT DOCUMENTS

| 2010/0142483 A1* | 6/2010 | Wu | H04M 15/62 |
| | | | 370/331 |
| 2018/0255447 A1* | 9/2018 | Chong | H04W 48/02 |

(Continued)

OTHER PUBLICATIONS

3GPP, "3rd Generation Partnership Project Technical Specification Group Radio Access Network; Radio Resource Control (RRC); Protocol specification", TS 25.331 V15.4.0 (Sep. 2018). (65 pages).

(Continued)

*Primary Examiner* — Joseph E Dean, Jr.
(74) *Attorney, Agent, or Firm* — Amin, Turocy & Watson, LLP

(57) ABSTRACT

Facilitating fast return to stand alone advanced networks (e.g., 5G, 6G, and beyond) after voice fall back is provided herein. Operations of a method can comprise receiving, from a first network device and by a second network device, a connection request that comprises an indication of a fall back procedure. The fall back procedure can be an "RRC release and redirect" or an "IRAT Handover." The method also can comprise facilitating control of the voice communication for the mobile device and triggering a release of the control of the mobile device from the second network device based on a determination that the voice communication has completed. The fast return procedure can be either a "RRC release and redirect' or an "IRAT handover." Further, the method can comprise redirecting the mobile device to a third network device selected based on a capability of the mobile device.

20 Claims, 12 Drawing Sheets

(56) References Cited

U.S. PATENT DOCUMENTS

2020/0245195 A1* 7/2020 Zhu ...................... H04W 36/12
2020/0413297 A1* 12/2020 Chiang ............. H04W 36/0022

OTHER PUBLICATIONS

3GPP, "3rd Generation Partnership Project Technical Specification Group Radio Access Network—Evolved Universal Terrestrial Radio Access (E-UTRA)—Evolved Universal Terrestrial Radio Access (E-UTRA)—Protocol specification", TS 36.331, Jun. 2018, 791 pages.

* cited by examiner

US 11,310,701 B2

FACILITATING FAST RETURN TO STAND ALONE ADVANCED NETWORKS AFTER VOICE FALL BACK

CROSS-REFERENCE TO RELATED APPLICATIONS

This application claims the benefit of priority to U.S. Provisional Application No. 62/950,461, filed Dec. 19, 2019, and entitled "FACILITATING FAST RETURN TO STAND ALONE ADVANCED NETWORKS AFTER VOICE FALL BACK," the entirety of which is expressly incorporated herein by reference.

TECHNICAL FIELD

This disclosure relates generally to the field of mobile communications and, more specifically, to returning control to a stand-alone Fifth Generation (5G) or other advanced network after voice fall back to another network.

BACKGROUND

To meet the huge demand for data centric applications, Third Generation Partnership Project (3GPP) systems and systems that employ one or more aspects of the specifications of the Fourth Generation (4G) standard for wireless communications will be extended to a Fifth Generation (5G) standard for wireless communications. Unique challenges exist to provide levels of service associated with forthcoming 5G, or other next generation, standards for wireless communication.

BRIEF DESCRIPTION OF THE DRAWINGS

Various non-limiting embodiments are further described with reference to the accompanying drawings in which.

DETAILED DESCRIPTION

Figure 1:
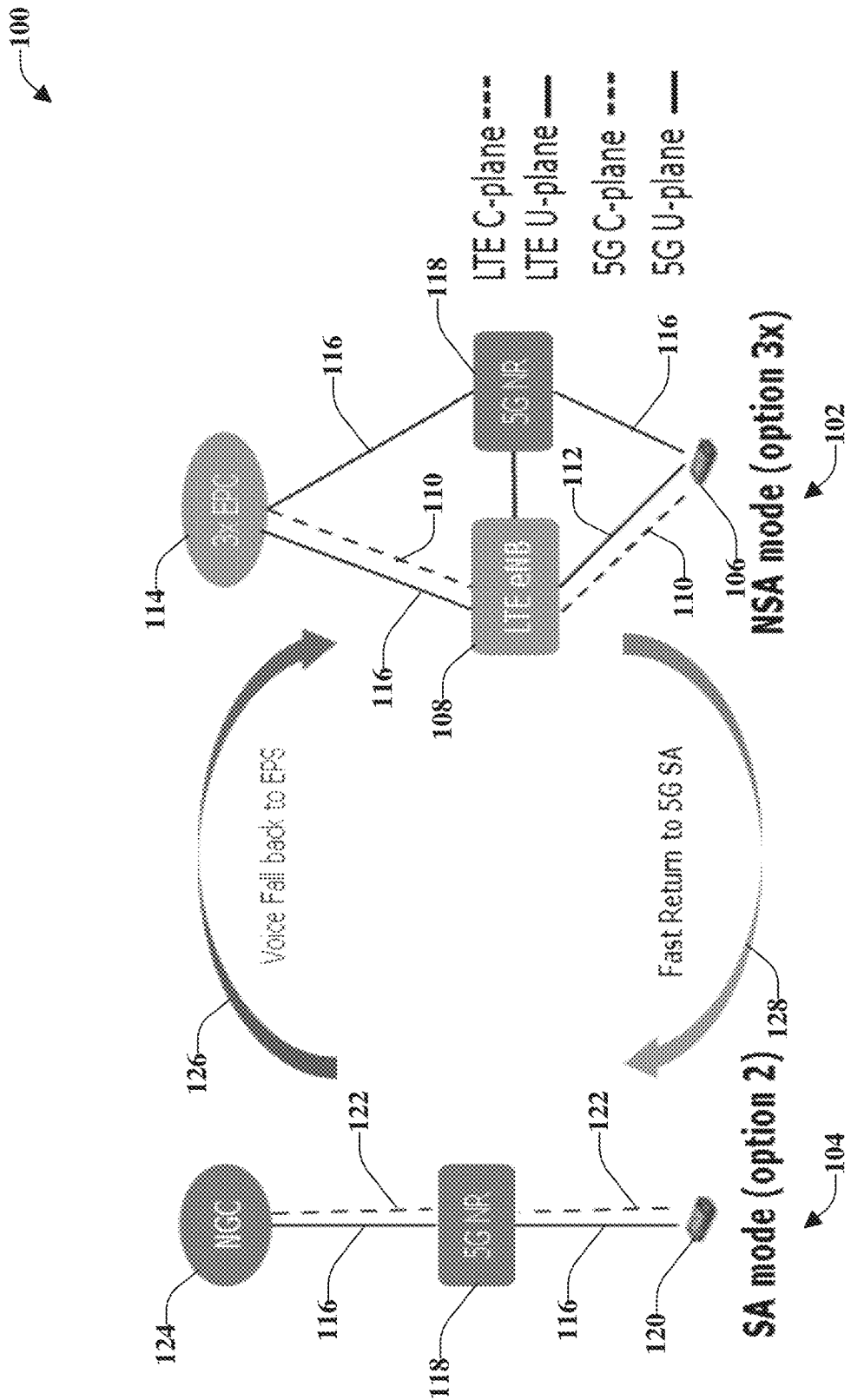
FIG. 1 illustrates an example, non-limiting, representation of a communication network showing a non-stand-alone mode and a standalone mode for advanced communications networks.

One or more embodiments are now described more fully hereinafter with reference to the accompanying drawings in which example embodiments are shown. In the following description, for purposes of explanation, numerous specific details are set forth in order to provide a thorough understanding of the various embodiments. However, the various embodiments can be practiced without these specific details (and without applying to any particular networked environment or standard).

Described herein are systems, methods, articles of manufacture, and other embodiments or implementations that can facilitate fast return to stand alone advanced networks after voice fall back. There are two modes for 5G deployment: NSA (Non Standalone) and SA (Standalone). NSA is for initial 5G deployment where the 5G data will use new 5G data carriers, while the control-plane stays on the mature LTE network. As 5G carrier coverage increases, both control and data will use 5G carriers, which is referred to as the SA deployment (or simply SA).

In the initial 5G deployment, the 5G network can be launched in NSA mode where the voice stays on LTE (VoLTE). When the 5G network starts migrating to SA mode, it is expected that for voice service, VoLTE Evolved Packet System (EPS) fall back (e.g., return) will be used as a transition, until the network has enough good SA NR coverage to support VoNR (Voice over New Radio). This can be similar to the early days of LTE deployment, Circuit Switched FallBack (CSFB) to 3G voice was used as a transition until LTE coverage was determined to be good enough to support VoLTE.

When the 5G voice falls back to EPS, the 5G data also falls back to 5G NSA mode, or falls back to LTE only when there is no 5G NSA coverage. When the voice call is complete, it is possible that the device does not immediately go back to (e.g., return to) 5G SA mode. Instead, the device could hang in NSA mode (or LTE) for a while (e.g., sometimes a long time) due to small intermittent data applications running in the background. Accordingly, the 5G user experience can be negatively impacted since the user does not experience the benefits of 5G while in the NSA mode (or LTE).

The disclosed aspects can force the 5G UE to immediately (or as quickly as possible) return to 5G SA mode after completion of the voice call. This can improve the 5G user experience by maximizing the time the device is on 5G SA mode. 5G SA mode enables lower latency, higher speed, access to new 5G services, reduced device power consumption, and more efficient network spectrum utilization.

When the 5G network starts migrating to SA mode, it is expected that for voice service, VoLTE EPS fall back will be used as a transition, until the network has enough good SA NR coverage to support VoNR. When the 5G voice falls back to EPS, the 5G data also falls back to NSA mode. Upon or after the voice call is complete, per 3GPP procedure, the 5G UE device goes to idle mode when the data transmission is also completed. In idle mode, the 5G UE device performs cell reselection and can camp on 5G SA cell, based on network configured cell reselection priority.

However, in real world networks, with high probability, the device does not immediately (or soon after completing the voice call) go back to 5G SA mode. Instead, the device hangs in NSA mode for a while due to the small intermittent data applications running in the background, which prevents the UE from going to idle mode. As mentioned, the 5G user experience is impacted and the user cannot access new services provided via the 5G SA platform. 5G UE power consumption is also higher in the NSA mode.

According to an embodiment, provided is a method comprising receiving, from a first network device by a second network device comprising a memory and a processor, a connection request that comprises an indication of a fall back procedure. The connection request can be associated with a mobile device via which a voice communication is scheduled to occur. The method also can comprise facilitating, by the second network device, control of the voice communication for the mobile device and triggering, by the second network device, a release of the control of the mobile device from the second network device based on a determination that the voice communication has completed at the mobile device. Further, the method can comprise redirecting, by the second network device, the mobile device to a third network device selected based on a capability of the mobile device.

In an example, receiving the indication of the fall back procedure can comprise receiving an information element that comprises an evolved packet system return request. Further to this example, the information element can be a first information element. In addition, redirecting the mobile device to the third network device can comprise receiving a second information element that comprises redirected carrier information.

According to an implementation, the method can comprise, prior to the triggering the release of the mobile device, evaluating, by the second network device, the capability of the mobile device based on the determination that the voice communication has completed at the mobile device. Further to this implementation, evaluating the capability of the mobile device can comprise determining the mobile device is able to support communication with a defined band on a standalone network.

In some implementations, redirecting the mobile device to the third network device can comprise determining that multiple advanced network bands are supported by the mobile device. Further, the method can comprise selecting an advanced network band from the multiple advanced network bands based on a second determination that the advanced network band comprises a priority that satisfies a defined priority level as compared to other advanced network bands of the multiple advanced network bands other than the advanced network band.

According to another example, triggering the release of the mobile device can comprise evaluating an occurrence of a defined event. Further to this example, the defined event can be the voice communication being a voice communication that originated from the first network device.

In another example, the first network device is a network device configured to operate according to a fifth generation wireless network communication protocol. Further, in some implementations, the second network device can be deployed in a standalone deployment architecture. In some implementations, the first network device can be a network device configured to operate according to a long term evolution network communication protocol. According to an example, the first network device and the third network device can be a same network device. Alternatively, the first network device and the third network device can be different network devices.

Another embodiment relates to a system that can comprise a processor and a memory that stores executable instructions that, when executed by the processor, facilitate performance of operations. The operations can comprise controlling a first communication for a user equipment based on a connection request that comprises an indication of a fall back procedure. The connection request can be associated with the user equipment via which the first communication is scheduled to occur. The connection request can be received from network equipment. Further, the operations can comprise releasing a first control of the user equipment based on a determination that the first communication has completed at the user equipment. The operations also can comprise redirecting the user equipment to the network equipment for a second control of a second communication scheduled to occur at the user equipment.

In an implementation, the indication can comprise a first information element that comprises an evolved packet system return request. Further to this implementation, redirecting the user equipment can comprise receiving a second information element that comprises redirected carrier information.

According to some implementations, the operations can comprise, prior to releasing the control of the user equipment, evaluating a capability of the user equipment based on the determination that the first communication has completed at the user equipment. Further to these implementations, evaluating the capability can comprise determining the user equipment is able to support communication with a defined band on a standalone network.

Yet another embodiment relates to a non-transitory machine-readable storage medium, comprising executable instructions that, when executed by a processor, facilitate performance of the executable instructions. The executable instructions can comprise determining a first communication of a mobile device is to be controlled by a first network device based on a connection request that comprises an indication of a fall back procedure. The executable instructions also can comprise facilitating a control of the first communication by the first network device for a duration of the first communication and facilitating a release of the control of the mobile device by the first network device based on a determination that the first communication has completed at the mobile device. Further, the executable instructions can comprise transferring the control of the mobile device to a second network device based on a capacity of the mobile device.

In an implementation, transferring the control of the mobile device to the second network device can comprise determining that multiple advanced network bands are supported by the mobile device. Further, an advanced network band can be selected from the multiple advanced network bands based on a second determination that the advanced network band comprises a priority that satisfies a defined priority level as compared to other advanced network bands of the multiple advanced network bands other than the advanced network band.

In some implementations, the indication can comprise a first information element that comprises an evolved packet system return request. Further, redirecting the mobile device can comprise receiving a second information element that comprises redirected carrier information.

FIG. 1 illustrates an example, non-limiting, representation of a communication network showing a non-stand-alone (NSA) mode 102 and a standalone (SA) mode 104 for advanced communications networks. The illustrated NSA mode 102 comprises a device 106 that connects to an LTE eNB device 108 via a LTE C-plane 110 and a LTE U-plane 112. The LTE eNB device 108 communicates to an EPC 114 via the LTE C-Plane 110 and a 5G U-plane 116. In addition, the device 106 connects to a 5G NR device 118 via the 5G U-plane 116. The 5G NR device 118 communicates with the EPC 114 via the 5G U-plane 116.

The illustrated SA mode 104 comprises a device 120 that communicates to the 5G NR device 118 via the 5G U-plane 116 and a 5G C-plane 122. The 5G NR device 118 communicates with a Next Generation Core (NGC) 124 via the 5G U-plane 116 and the 5G C-plane 122.

In the SA mode 104, there can be voice fall back to EPS, as indicated by arrow 126. In the NSA mode 102, upon or after the voice call completes, the LTE eNB device 108 immediately (or as quickly as possible) triggers a "Radio Resource Control (RRC) Release and Redirect" or an "IRAT Handover" to 5G SA mode as discussed herein. The LTE eNB device 108 does not wait for the data leg to become idle per 3GPP procedure. Upon or after the Release and Redirect or handover completes, the data transmission will continue. Accordingly, there can be a fast return to 5G SA, as indicated by arrow 128. The fast return procedure can be an "RRC release and redirect" or an "IRAT handover."

Figure 2:
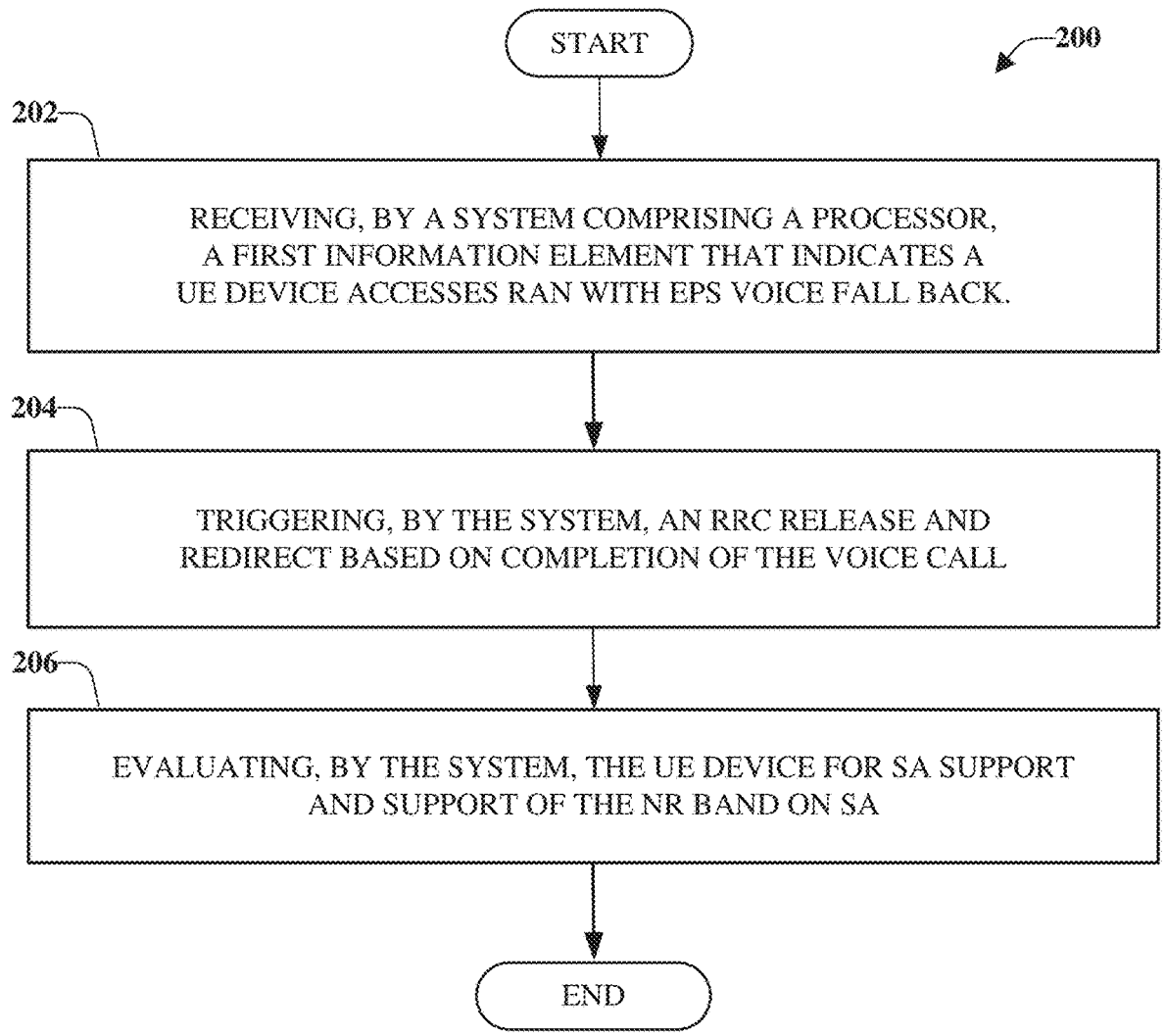
FIG. 2 illustrates an example, non-limiting, computer-implemented method for fast return to a standalone advanced communications network in accordance with one or more embodiments described herein.

FIG. 2 illustrates an example, non-limiting, computer-implemented method 200 for fast return to a standalone advanced communications network in accordance with one or more embodiments described herein. In the NSA mode, upon or after the voice call completes but there is still on-going data transmission, the LTE eNB can immediately (or as quickly as possible) trigger an "RRC Release and Redirect" to 5G SA mode. To enable the fast return, the computer-implemented method 200 starts, at 202, with receiving a first Information Element (IE) that indicates a UE Device accesses RAN with EPS voice fall back. The first IE can be a "mo-EPS fall back" that can be included in an RRC connection request. The first IE can be indicated upon or after the UE device accesses RAN with EPS voice fall back (further details will be provided below).

At 204 of the computer-implemented method 200, an RRC release and redirect can be triggered based on completion of the voice call. For example, the LTE eNB device can remember the UE device and, upon or after the UE device completes its voice call, the eNB can identify the UE device and can immediately (or as quickly as possible) trigger an "RRC Release and Redirect" to send the UE device back to 5G SA mode. The redirect can be based on an "event." Accordingly, the redirect is not triggered upon or after any VoLTE call but is redirected only for the call that was EPS fallback from the 5G SA to the NSA/LTE.

Further, in order for the LTE eNB device to redirect to the correct NR SA, at 206 of the computer-implemented method 200, the UE device can be evaluated or checked to determine if the UE device is capable to support SA and support the NR band on the SA. If multiple NR bands (nr-arfcn) are supported, then the LTE eNB device should redirect to the highest priority based on a configured order based on rules and/or policies.

Figure 3:
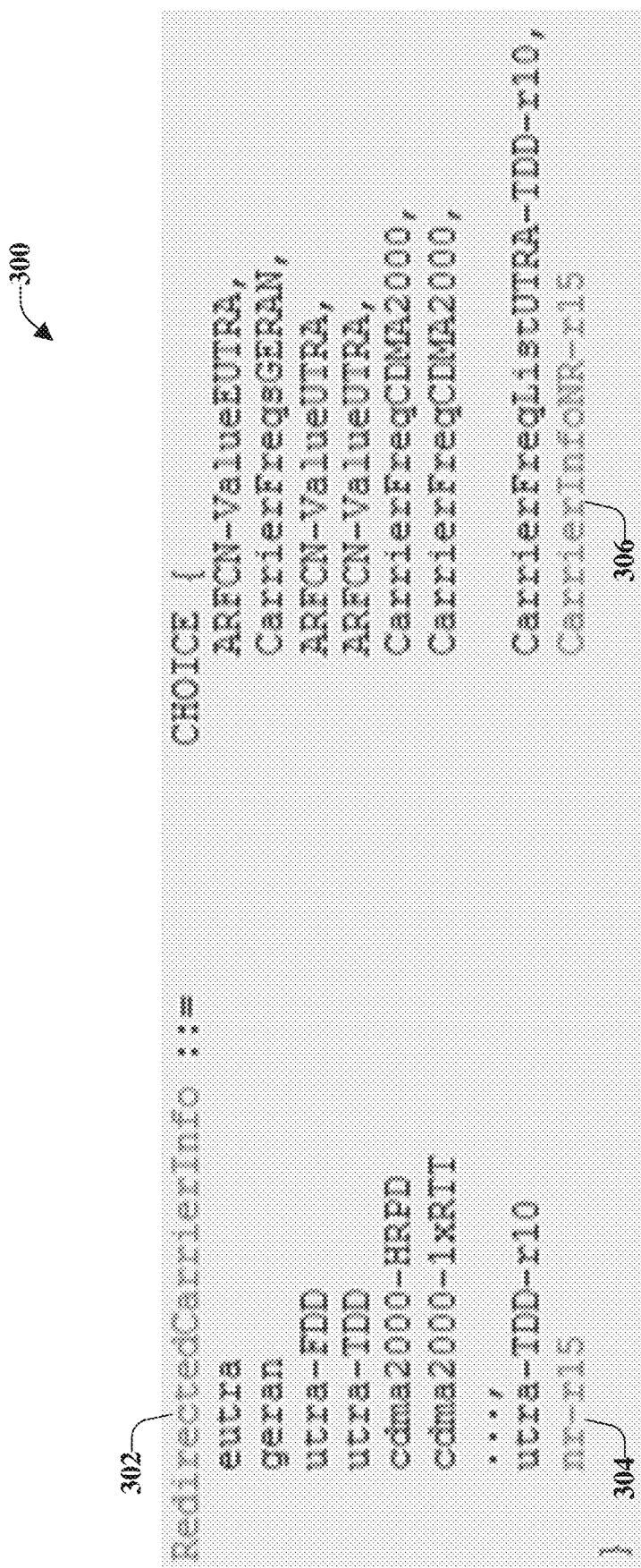
FIG. 3 illustrates an example, non-limiting, radio resource control release and redirect message in accordance with one or more embodiments described herein.

The RRC release and redirect message that supports NR-carriers Information Elements (IE) can use the example, non-limiting message illustrated in FIG. 3. As illustrated, for RedirectedCarrierInfo 302 there can be a choice for "nr-r15" 304 and "CarrierInfoNR-r15" 306, or simply "CarrierInfoNR".

Figure 4:
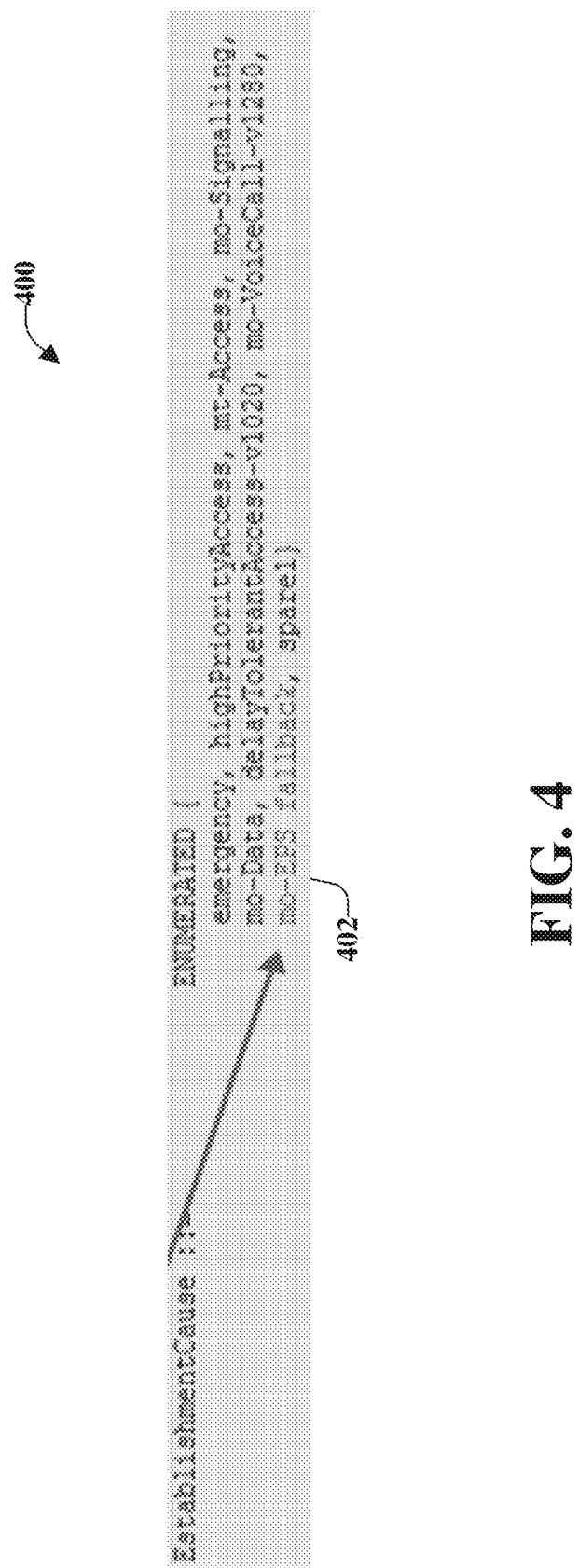
FIG. 4 illustrates an example, non-limiting, portion of a radio resource control connection request message in accordance with one or more embodiments described herein.

Further, illustrated in FIG. 4 is a portion of an example, non-limiting, RRC connection request message 400. As indicated, a new IE, "mo-EPS fallback" 402 can be added to the RRC connection request message 400. The eNB can use this indication to trigger fast return to 5G SA.

Benefits of the disclosed aspects include, but are not limited to, an improvement to the 5G user experience by maximizing the time on 5G SA network, which can provide lower latency, higher speed, 5G new services, and/or 5G new experiences. Further, the disclosed aspects can improve UE device power consumption (lower power consumption in SA mode). In addition, the disclosed aspects can improve network resource/spectrum utilization by putting the network traffic at its designated layer.

Figure 5:
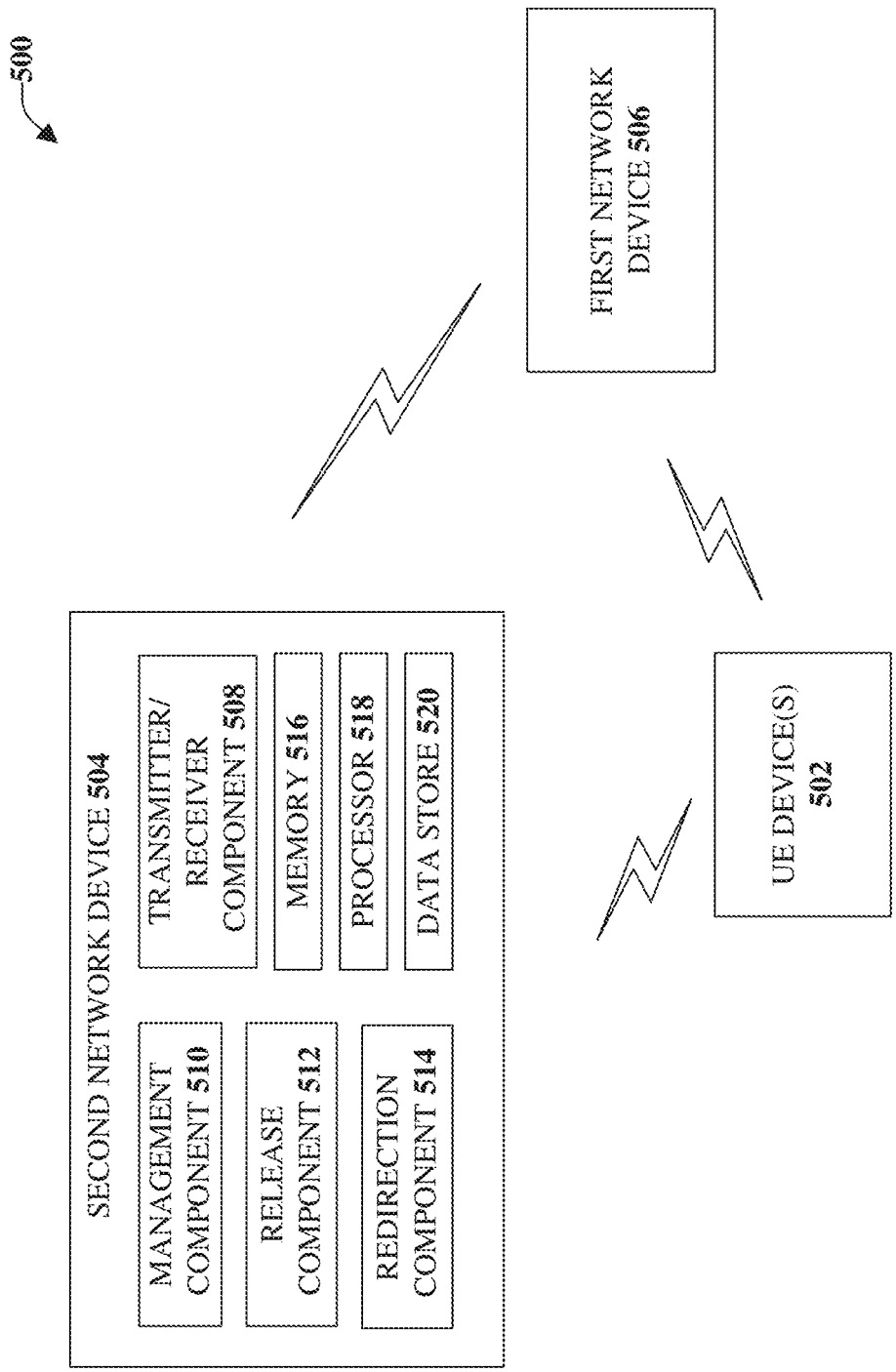
FIG. 5 illustrates an example, non-limiting, system that facilitates fast return to stand alone advanced networks after voice fall back in accordance with one or more embodiments described herein.

FIG. 5 illustrates an example, non-limiting, system 500 that facilitates fast return to stand alone advanced networks after voice fall back in accordance with one or more embodiments described herein. Repetitive description of like elements employed in other embodiments described herein is omitted for sake of brevity.

The system 500 can comprise a mobile device or UE device 502 (e.g., the device 120), first network equipment, illustrated as a first network device 504 (e.g., the 5G NR device 118), and second network equipment, illustrated as a second network device 506 (e.g., the LTE eNB device 108). Aspects of systems (e.g., the system 500 and the like), apparatuses, or processes explained in this disclosure can constitute machine-executable component(s) embodied within machine(s) (e.g., embodied in one or more computer readable mediums (or media) associated with one or more machines). Such component(s), when executed by the one or more machines (e.g., computer(s), computing device(s), virtual machine(s), and so on) can cause the machine(s) to perform the operations described.

In various embodiments, the UE device 502 can be any type of component, machine, device, facility, apparatus, and/or instrument that comprises a processor and/or can be capable of effective and/or operative communication with a wired and/or wireless network. Components, machines, apparatuses, devices, facilities, and/or instrumentalities that can comprise the UE device 502 can include tablet computing devices, handheld devices, server class computing machines and/or databases, laptop computers, notebook computers, desktop computers, cell phones, smart phones, consumer appliances and/or instrumentation, industrial and/or commercial devices, hand-held devices, digital assistants, multimedia Internet enabled phones, multimedia players, and the like.

As illustrated in FIG. 5, the first network device 504 can include a transmitter/receiver component 508, a management component 510, a release component 512, a redirection component 514, at least one memory 516, at least one processor 518, and at least one data store 520.

The transmitter/receiver component 508 can receive, from the second network device 506 a connection request that comprises an indication of a fall back procedure. The connection request can be associated with the UE device 502 based on a voice communication determined to be scheduled to occur (e.g., a voice call is initiated, a voice call is received, and so on). The fall back procedure can be either an "RRC release and redirect" or an "IRAT Handover."

Based on the indication of the fall back procedure, the management component 510 can facilitate control of the voice communication for the UE device 502. For example, the voice call can be handled by the second network device 506 while other communication (e.g., data communication) is handled by the first network device 504.

Based on a determination that the voice communication has completed at the mobile device, the release component 512 can trigger a release of the control of the UE device 502 from the first network device 504. This trigger can occur at about the same time as the voice call is ended, or after the voice call has ended, according to various implementations. The fast return can be either an "RRC release and redirect" or an "IRAT handover."

The redirection component 514 can redirect the UE device 502 to a third network device (not shown). The third network device can be selected based on a capability of the UE device 502.

The at least one memory 516 can be operatively connected to the at least one processor 518. The at least one memory 516 can store executable instructions that, when executed by the at least one processor 518 can facilitate performance of operations. Further, the at least one processor 518 can be utilized to execute computer executable components stored in the at least one memory 516.

For example, the at least one memory 516 can store protocols associated with facilitating fast return to an advanced network after fall back to another network as discussed herein. Further, the at least one memory 516 can facilitate action to control communication between the first network device 504, the UE device 502, the second network device 506, other network devices, and/or other UE devices, such that the first network device 504 can employ stored protocols and/or algorithms to facilitate fast return to stand alone advanced networks after voice fall back as described herein.

It should be appreciated that data stores (e.g., memories) components described herein can be either volatile memory or nonvolatile memory, or can include both volatile and nonvolatile memory. By way of example and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of example and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Memory of the disclosed aspects are intended to comprise, without being limited to, these and other suitable types of memory.

The at least one processor 518 can facilitate respective analysis of information related to facilitating fast return to stand alone advanced networks after voice fall back. The at least one processor 518 can be a processor dedicated to analyzing and/or generating information received, a processor that controls one or more components of the first network device 504, and/or a processor that both analyzes and generates information received and controls one or more components of the first network device 504.

Further, the term network device is used herein to refer to any type of network node serving mobile devices and/or connected to other network nodes, network elements, or another network node from which the mobile devices can receive a radio signal. In cellular radio access networks (e.g., universal mobile telecommunications system (UMTS) networks), network nodes can be referred to as base transceiver stations (BTS), radio base station, radio network nodes, base stations, NodeB, eNodeB (e.g., evolved NodeB), and so on. In 5G terminology, the network nodes can be referred to as gNodeB (e.g., gNB) devices. Network nodes can also comprise multiple antennas for performing various transmission operations (e.g., MIMO operations). A network node can comprise a cabinet and other protected enclosures, an antenna mast, and actual antennas. Network nodes can serve several cells, also called sectors, depending on the configuration and type of antenna. Examples of network nodes can include but are not limited to: NodeB devices, base station (BS) devices, access point (AP) devices, and radio access network (RAN) devices. The network nodes can also include multi-standard radio (MSR) radio node devices, comprising: an MSR BS, an eNode B, a network controller, a radio network controller (RNC), a base station controller (BSC), a relay, a donor node controlling relay, a base transceiver station (BTS), a transmission point, a transmission node, a Remote Radio Unit (RRU), a Remote Radio Head (RRH), nodes in distributed antenna system (DAS), and the like.

It is noted that the second network device 506 and the UE device 502 can comprise respective memories, processors, data stores, and/or other components.

Figure 6:
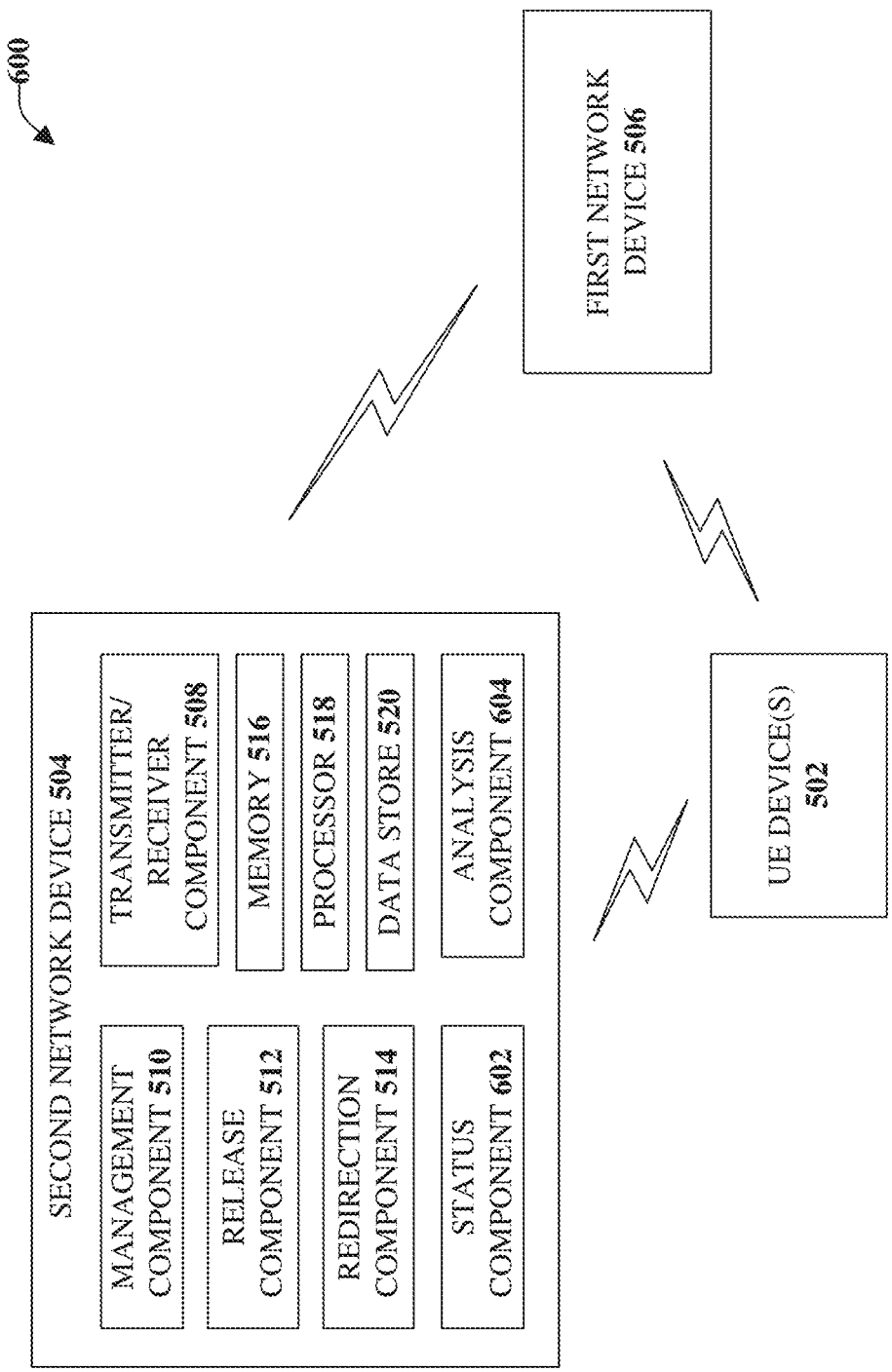
FIG. 6 illustrates an example, non-limiting, system that redirects a mobile device after call fall back based on capabilities of the mobile device in accordance with one or more embodiments described herein.

FIG. 6 illustrates an example, non-limiting, system 600 that redirects a mobile device after call fall back based on capabilities of the mobile device in accordance with one or more embodiments described herein. Repetitive description of like elements employed in other embodiments described herein is omitted for sake of brevity. The system 600 can comprise one or more of the components and/or functionality of the system 500, and vice versa.

The management component 510 can control a first communication for a mobile device (e.g., the UE device 502) based on a connection request that comprises an indication of a fall back procedure. The indication can comprise a first information element that comprises an evolved packet system return request. The connection request can be associated with the UE device 502 via which the first communication is scheduled to occur. Further, the connection request is received from a network device (e.g., the first network device 504 or another network device).

A status component 602 can determine whether the voice call has completed at the UE device 502. According to some implementations, the determination by the status component 602 can be based on information received from the UE device 502. According to another implementation, the determination by the status component 602 can be based on information received from a network device that is facilitating the voice call between the UE device 502 and another device.

Upon or after the status component 602 determines the voice call has completed, an analysis component 604 can evaluate a capability of the UE device 502. For example, the analysis component 604 can determine whether or not the UE device 502 is able to support communication with a defined band on a standalone network.

Upon or after determining the voice call has completed at the UE device 502, the release component 512 can release a first control of the UE device 502. Further, the redirection component 514 can redirect the UE device 502 to the network device (e.g., the first network device 504 or another network device) for a second control of a second communication scheduled to occur at the UE device 502.

According to some implementations, the redirection component 514 can redirect the UE device 502 based on whether or not the UE device 502 can support communication with the defined band on the standalone network, as determined by the analysis component 604.

According to some implementations, the determination by the analysis component 604 can be that the UE device 502 can support multiple advanced network bands. Thus, the redirection component 514 can select an advanced network band from the multiple advanced network bands. The selection by the redirection component 514 can be based on a second determination that the advanced network band comprises a priority that satisfies a defined priority level as compared to other advanced network bands of the multiple advanced network bands other than the advanced network band.

Figure 7:
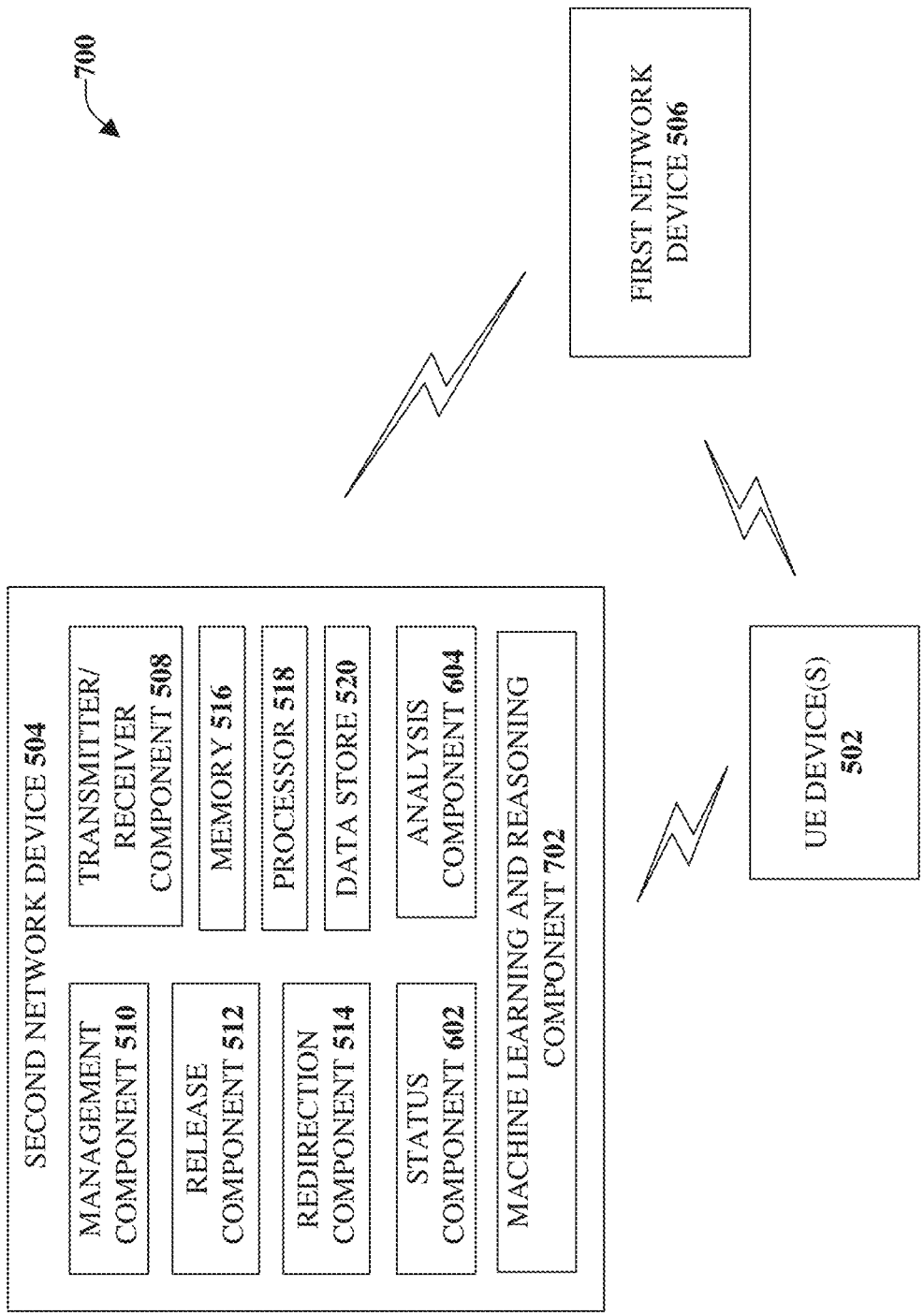
FIG. 7 illustrates an example, non-limiting, system that employs automated learning to facilitate one or more of the disclosed aspects in accordance with one or more embodiments described herein.

FIG. 7 illustrates an example, non-limiting, system 700 that employs automated learning to facilitate one or more of the disclosed aspects in accordance with one or more embodiments described herein. Repetitive description of like elements employed in other embodiments described herein is omitted for sake of brevity. The system 700 can comprise one or more of the components and/or functionality of the system 500, the system 600, and vice versa.

The system 700 can comprise a machine learning and reasoning component 702 that can be utilized to automate one or more of the disclosed aspects. The machine learning and reasoning component 702 can employ automated learning and reasoning procedures (e.g., the use of explicitly and/or implicitly trained statistical classifiers) in connection with performing inference and/or probabilistic determinations and/or statistical-based determinations in accordance with one or more aspects described herein.

For example, the machine learning and reasoning component 702 can employ principles of probabilistic and decision theoretic inference. Additionally, or alternatively, the machine learning and reasoning component 702 can rely on predictive models constructed using machine learning and/or automated learning procedures. Logic-centric inference can also be employed separately or in conjunction with probabilistic methods.

The machine learning and reasoning component 702 can infer whether a device is a device for which a voice call is being handled based on a fall back from an advanced communications network. Further, the machine learning and reasoning component 702 can infer whether a fall back information element was received and associated with the mobile device. The machine learning and reasoning component 702 can also infer a capability (or more than one capability) of the mobile device. Based on this knowledge, the machine learning and reasoning component 702 can make an inference based on whether to automatically return control of the mobile device to an advanced network, and to which network device to return the control.

As used herein, the term "inference" refers generally to the process of reasoning about or inferring states of a system, a component, a module, an environment, and/or devices from a set of observations as captured through events, reports, data and/or through other forms of communication. Inference can be employed to identify a specific condition, modification, and/or effect, or can generate a probability distribution over states, for example. The inference can be probabilistic. For example, computation of a probability distribution over states of interest based on a consideration of data and/or events. The inference can also refer to techniques employed for composing higher-level events from a set of events and/or data. Such inference can result in the construction of new events and/or actions from a set of observed events and/or stored event data, whether or not the events are correlated in close temporal proximity, and whether the events and/or data come from one or several events and/or data sources. Various classification schemes and/or systems (e.g., support vector machines, neural networks, logic-centric production systems, Bayesian belief networks, fuzzy logic, data fusion engines, and so on) can be employed in connection with performing automatic and/or inferred action in connection with the disclosed aspects.

The various aspects (e.g., in connection with facilitating fast return to stand alone advanced networks after voice fall back) can employ various artificial intelligence-based schemes for carrying out various aspects thereof. For example, a process for determining if fast return of a mobile device to a standalone advanced network can be enabled through an automatic classifier system and process can be enabled as discussed herein.

A classifier is a function that maps an input attribute vector, $x=(x1, x2, x3, x4, xn)$, to a confidence that the input belongs to a class. In other words, $f(x)=confidence(class)$. Such classification can employ a probabilistic and/or statistical-based analysis (e.g., factoring into the analysis utilities and costs) to provide a prognosis and/or infer one or more actions that should be employed to determine what action to be automatically performed.

A Support Vector Machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that can be similar, but not necessarily identical to training data. Other directed and undirected model classification approaches (e.g., naïve Bayes, Bayesian networks, decision trees, neural networks, fuzzy logic models, and probabilistic classification models) providing different patterns of independence can be employed. Classification as used herein, can be inclusive of statistical regression that is utilized to develop models of priority.

One or more aspects can employ classifiers that are explicitly trained (e.g., through a generic training data) as well as classifiers that are implicitly trained (e.g., by retaining a database of triggers, historical changes, and impacts). For example, SVMs can be configured through a learning or training phase within a classifier constructor and feature selection module. Thus, a classifier(s) can be used to automatically learn and perform a number of functions, including but not limited to facilitating fast return to stand alone advanced networks after voice fall back.

Methods that can be implemented in accordance with the disclosed subject matter will be better appreciated with reference to various flow charts. While, for purposes of simplicity of explanation, the methods are shown and described as a series of blocks, it is to be understood and appreciated that the disclosed aspects are not limited by the number or order of blocks, as some blocks can occur in different orders and/or at substantially the same time with other blocks from what is depicted and described herein. Moreover, not all illustrated blocks can be required to implement the disclosed methods. It is to be appreciated that the functionality associated with the blocks can be implemented by software, hardware, a combination thereof, or any other suitable means (e.g., device, system, process, component, and so forth). Additionally, it should be further appreciated that the disclosed methods are capable of being stored on an article of manufacture to facilitate transporting and transferring such methods to various devices. Those skilled in the art will understand and appreciate that the methods could alternatively be represented as a series of interrelated states or events, such as in a state diagram.

Figure 8:
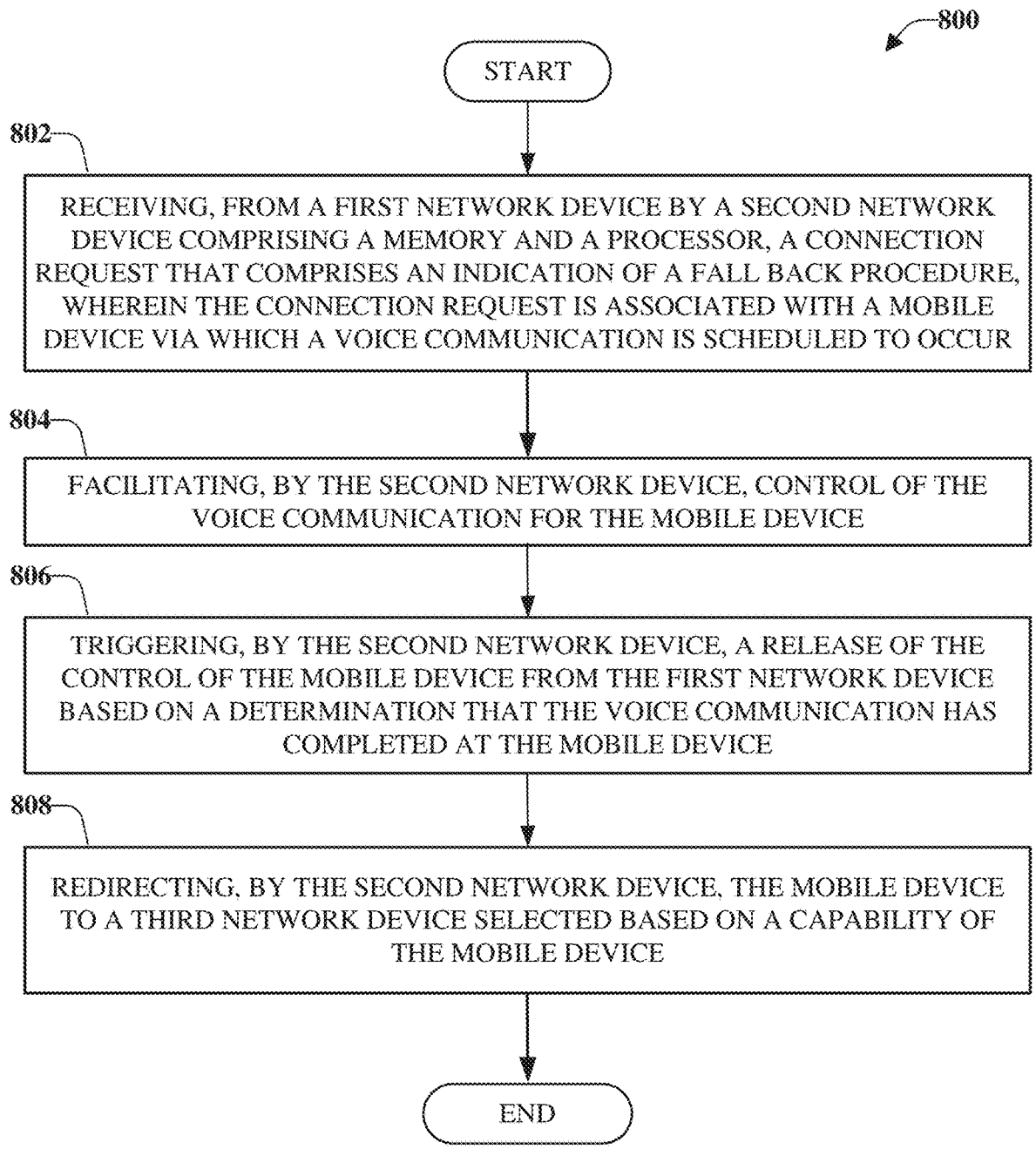
FIG. 8 illustrates a flow diagram of an example, non-limiting, computer-implemented method for facilitating fast return to stand alone advanced networks after voice fall back in accordance with one or more embodiments described herein.

FIG. 8 illustrates a flow diagram of an example, non-limiting, computer-implemented method 800 for facilitating fast return to stand alone advanced networks after voice fall back in accordance with one or more embodiments described herein. Repetitive description of like elements employed in other embodiments described herein is omitted for sake of brevity.

In some implementations, a system comprising a processor can perform the computer-implemented method 800 and/or other methods discussed herein. In other implementations, a device comprising a processor can perform the computer-implemented method 800 and/or other methods discussed herein. In other implementations, a machine-readable storage medium, can comprise executable instructions that, when executed by a processor, facilitate performance of operations, which can be the operations discussed with respect to the computer-implemented method 800 and/or other methods discussed herein. In further implementations, a machine readable or computer readable storage device comprising executable instructions that, in response to execution, cause a system comprising a processor to perform operations, which can be operations discussed with respect to the computer-implemented method 800 and/or other methods discussed herein.

The computer-implemented method 800 starts at 802 with receiving, from a first network device by a second network device comprising a memory and a processor, a connection request that comprises an indication of a fall back procedure. The connection request can be associated with a mobile device via which a voice communication is scheduled to occur. In some implementations, the connection request can be a radio release control connection request.

According to some implementations, receiving the indication of the fall back procedure can comprise receiving an information element that comprises an evolved packet system return request. Thus, if a device has a voice communication scheduled to occur but is not associated with an information element that comprises an evolved packet system return request, that device does not fall back to the advanced network, as discussed herein.

In an example, the information element can be defined as "mo-EPS fall back," however, the disclosed aspects are not limited to this wording and other information elements can be utilized. The information element utilized can be included in an RRC connection request message, for example. The information element can be provided in the RRC connection request message at about the same time as the UE accesses RAN with EPC voice fall back as discussed herein.

At 804, control of the voice communication for the mobile device can be facilitated by the second network device. The control of the communication can be facilitated by the second network device for a duration of the voice communication. A release of the control of the mobile device from the second network device can be triggered, at 806, based on a determination that the voice communication has completed at the mobile device. In an example, the second network device can provide an indication that the voice communication has completed at the mobile device. In another example, the mobile device can provide the indication that the voice communication has completed. In some implementations, the indication that the voice communication has completed can be facilitated by both the second network device and the mobile device and/or by one or more other devices.

To facilitate the release of the control of the mobile device from the second network device, the first network device can retain information related to the mobile device prior to control being transferred to the second network device. Accordingly, upon or after the mobile device completes the voice call, the first network device can identify the mobile device and can trigger a notification to return the mobile device to a 5G SA mode. For example, the notification can be an RRC release and redirect message. The notification can be an "event" that causes implementation of the fast return to stand alone advanced networks after voice fall back. The redirect is not triggered after any VoLTE call, but is only triggered for a call that was EPS fallback from the 5G SA to the NSA/LTE.

The mobile device can be redirected, by the second network device, to a third network device selected based on a capability of the mobile device, at 808. For example, redirecting the mobile device to the third network device can comprise determining that multiple advanced network bands are supported by the mobile device and selecting an advanced network band from the multiple advanced network bands based on a second determination that the advanced network band comprises a priority that satisfies a defined priority level as compared to other advanced network bands of the multiple advanced network bands other than the advanced network band.

The first network device can be a network device configured to operate according to a fifth generation wireless network communication protocol. Further, the second network device can be deployed in a standalone deployment architecture. The first network device can be a network device configured to operate according to a long term evolution network communication protocol. In some implementations, the first network device and the third network device are a same network device. In other implementations, the first network device and the third network device are different network devices.

Figure 9:
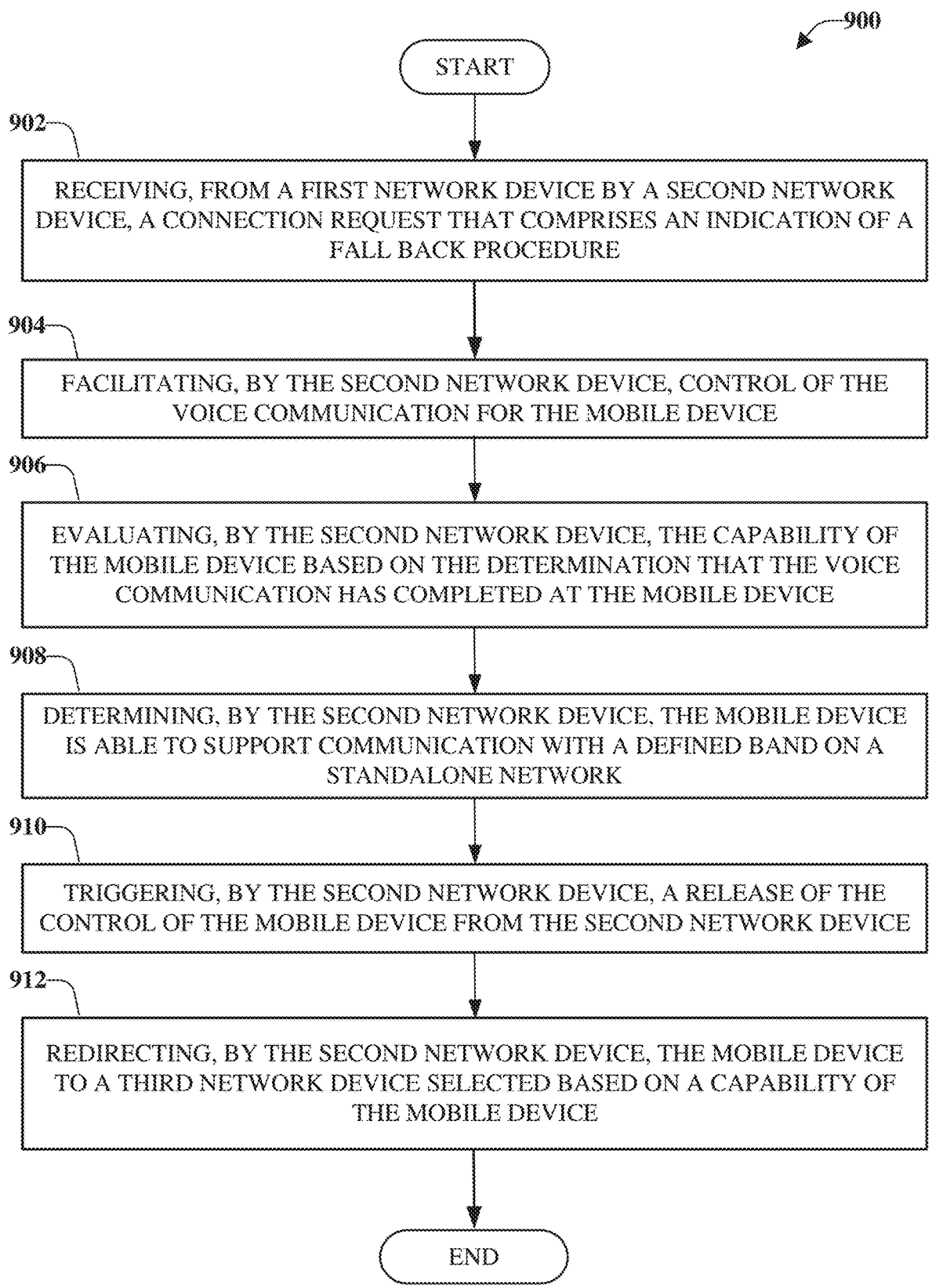
FIG. 9 illustrates a flow diagram of an example, non-limiting, computer-implemented method for releasing a user equipment device after voice fall back in accordance with one or more embodiments described herein.

FIG. 9 illustrates a flow diagram of an example, non-limiting, computer-implemented method 900 for releasing a user equipment device after voice fall back in accordance with one or more embodiments described herein. Repetitive description of like elements employed in other embodiments described herein is omitted for sake of brevity.

In some implementations, a system comprising a processor can perform the computer-implemented method 900 and/or other methods discussed herein. In other implementations, a device comprising a processor can perform the computer-implemented method 900 and/or other methods discussed herein. In other implementations, a machine-readable storage medium, can comprise executable instructions that, when executed by a processor, facilitate performance of operations, which can be the operations discussed with respect to the computer-implemented method 900 and/or other methods discussed herein. In further implementations, a machine readable or computer readable storage device comprising executable instructions that, in response to execution, cause a system comprising a processor to perform operations, which can be operations discussed with respect to the computer-implemented method 900 and/or other methods discussed herein.

The computer-implemented method 900 starts at 902 with receiving a connection request from a first network device. The connection request can comprise an indication of a fall back procedure and can be associated with a mobile device via which a communication is scheduled to occur. In an example, receiving the indication of the fall back procedure can comprise receiving an information element that comprises an evolved packet system return request. At 904, the second network device, which received the connection request, can facilitate control of the voice communication for the mobile device.

At 906 a capability of the mobile device can be evaluated by the second network device. Evaluating the capability of the mobile device can be performed based on the determination that the voice communication has completed at the mobile device. Further, at 908, the computer-implemented method 900 can determine the mobile device is able to support communication with a defined band on a standalone network.

At 910, the second network device can trigger a release of the control of the mobile device from the second network device. Further, at 912, the mobile device can be redirected to a third network device selected based on a capability of the mobile device and whether the mobile device is able to support communication with a defined band on a standalone network, as determined at 908.

According to some implementations, the information element received at 902 can be a first information element and redirecting the mobile device to the third network device, at 912, can comprise receiving a second information element that comprises redirected carrier information. In an example, the first network device and the third network device can be the same network device. In another example, the first network device and the third network device can be different network devices.

Figure 10:
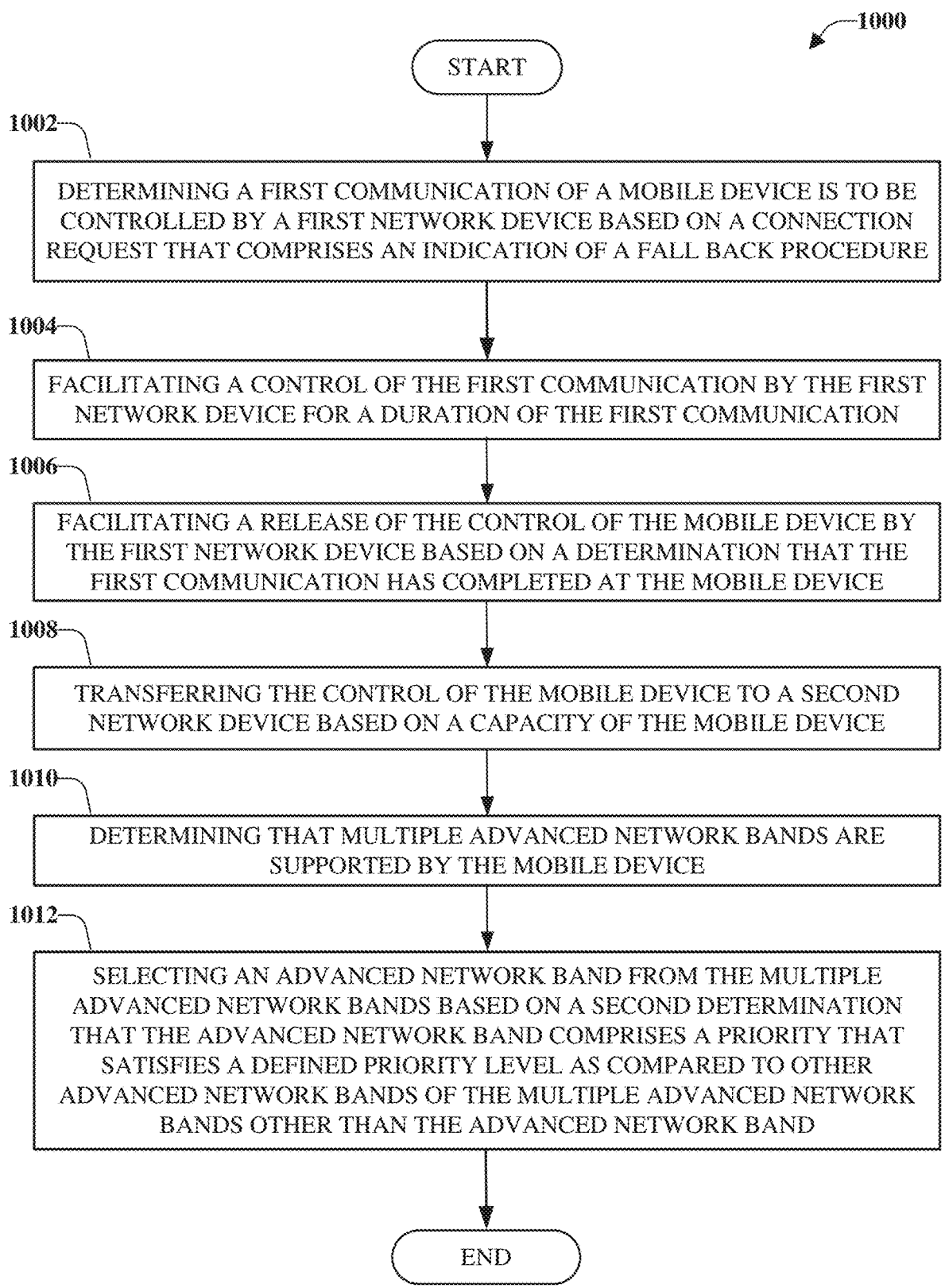
FIG. 10 illustrates a flow diagram of an example, non-limiting, computer-implemented method for releasing a user equipment device after voice fall back in accordance with one or more embodiments described herein.

FIG. 10 illustrates a flow diagram of an example, non-limiting, computer-implemented method 1000 for releasing a user equipment device after voice fall back in accordance with one or more embodiments described herein. Repetitive description of like elements employed in other embodiments described herein is omitted for sake of brevity.

In some implementations, a system comprising a processor can perform the computer-implemented method 1000 and/or other methods discussed herein. In other implementations, a device comprising a processor can perform the computer-implemented method 1000 and/or other methods discussed herein. In other implementations, a machine-readable storage medium, can comprise executable instructions that, when executed by a processor, facilitate performance of operations, which can be the operations discussed with respect to the computer-implemented method 1000 and/or other methods discussed herein. In further implementations, a machine readable or computer readable storage device comprising executable instructions that, in response to execution, cause a system comprising a processor to perform operations, which can be operations discussed with respect to the computer-implemented method 1000 and/or other methods discussed herein.

The computer-implemented method 1000 starts at 1002 upon or after a first communication of a mobile device is determined to be controlled by a first network device based on a connection request that comprises an indication of a fall back procedure. At 1004, the computer-implemented method 1000 facilitates a control of the first communication by the first network device for a duration of the first communication.

Further, at 1006, the computer-implemented method 1000 facilitates a release of the control of the mobile device by the first network device based on a determination that the first communication has completed at the mobile device.

The control of the mobile device can be transferred to a second network device based on a capacity of the mobile device, at 1008. To transfer the control to the second network device, the computer-implemented method 1000 can include, at 1010, determining that multiple advanced network bands are supported by the mobile device. In addition, at 1012, an advanced network band can be selected from the multiple advanced network bands based on a second determination that the advanced network band comprises a priority that satisfies a defined priority level as compared to other advanced network bands of the multiple advanced network bands other than the advanced network band.

According to some implementations, the indication can comprise a first information element that comprises an evolved packet system return request. Further to these implementations, redirecting the mobile device can comprise receiving a second information element that comprises redirected carrier information.

Described herein are systems, methods, articles of manufacture, and other embodiments or implementations that can facilitate fast return to stand alone advanced networks after voice fall back. Facilitating fast return to stand alone advanced networks after voice fall back can be implemented in connection with any type of device with a connection to the communications network (e.g., a mobile handset, a computer, a handheld device, etc.) any Internet of things (IoT) device (e.g., toaster, coffee maker, blinds, music players, speakers, water meter, etc.), and/or any connected vehicles (e.g., cars, airplanes, boats, space rockets, and/or other at least partially automated vehicles (e.g., drones), and so on). In some embodiments, the non-limiting term User Equipment (UE) is used. It can refer to any type of wireless device that communicates with a radio network node in a cellular or mobile communication system. Examples of UE are target device, device to device (D2D) UE, machine type UE or UE capable of machine to machine (M2M) communication, PDA, Tablet, mobile terminals, smart phone, Laptop Embedded Equipped (LEE), laptop mounted equipment (LME), USB dongles etc. Note that the terms element, elements and antenna ports can be interchangeably used but carry the same meaning in this disclosure. The embodiments are applicable to single carrier as well as to Multi-Carrier (MC) or Carrier Aggregation (CA) operation of the UE. The term Carrier Aggregation (CA) is also called (e.g., interchangeably called) "multi-carrier system," "multi-cell operation," "multi-carrier operation," "multi-carrier" transmission and/or reception.

In some embodiments, the non-limiting term radio network node or simply network node is used. It can refer to any type of network node that serves one or more UEs and/or that is coupled to other network nodes or network elements or any radio node from where the one or more UEs receive a signal. Examples of radio network nodes are Node B, Base Station (BS), Multi-Standard Radio (MSR) node such as MSR BS, eNode B, network controller, Radio Network Controller (RNC), Base Station Controller (BSC), relay, donor node controlling relay, Base Transceiver Station (BTS), Access Point (AP), transmission points, transmission nodes, RRU, RRH, nodes in Distributed Antenna System (DAS) etc.

To meet the huge demand for data centric applications, 4G standards can be applied to 5G, also called New Radio (NR) access. The 5G networks can comprise the following: data rates of several tens of megabits per second supported for tens of thousands of users; 1 gigabit per second can be offered simultaneously (or concurrently) to tens of workers on the same office floor; several hundreds of thousands of simultaneous (or concurrent) connections can be supported for massive sensor deployments; spectral efficiency can be enhanced compared to 4G; improved coverage; enhanced signaling efficiency; and reduced latency compared to Long Term Evolution (LTE).

Multiple Input, Multiple Output (MIMO) systems can significantly increase the data carrying capacity of wireless systems. For these reasons, MIMO is an integral part of the third and fourth generation wireless systems (e.g., 3G and 4G). In addition, 5G systems also employ MIMO systems, which are referred to as massive MIMO systems (e.g., hundreds of antennas at the transmitter side (e.g., network) and/receiver side (e.g., user equipment). With a $(N_t, N_r)$ system, where $N_t$ denotes the number of transmit antennas and Nr denotes the receive antennas, the peak data rate multiplies with a factor of $N_t$ over single antenna systems in rich scattering environment.

In addition, advanced networks, such as a 5G network can be configured to provide more bandwidth than the bandwidth available in other networks (e.g., 4G network, 5G network). A 5G network can be configured to provide more ubiquitous connectivity. In addition, more potential of applications and services, such as connected infrastructure, wearable computers, autonomous driving, seamless virtual and augmented reality, "ultra-high-fidelity" virtual reality, and so on, can be provided with 5G networks. Such applications and/or services can consume a large amount of bandwidth. For example, some applications and/or services can consume about fifty times the bandwidth of a high-definition video stream, Internet of Everything (IoE), and others. Further, various applications can have different network performance requirements (e.g., latency requirements and so on).

Cloud Radio Access Networks (cRAN) can enable the implementation of concepts such as SDN and Network Function Virtualization (NFV) in 5G networks. This disclosure can facilitate a generic channel state information framework design for a 5G network. Certain embodiments of this disclosure can comprise an SDN controller that can control routing of traffic within the network and between the network and traffic destinations. The SDN controller can be merged with the 5G network architecture to enable service deliveries via open Application Programming Interfaces (APIs) and move the network core towards an all Internet Protocol (IP), cloud based, and software driven telecommunications network. The SDN controller can work with, or take the place of, Policy and Charging Rules Function (PCRF) network elements so that policies such as quality of service and traffic management and routing can be synchronized and managed end to end.

Figure 11:
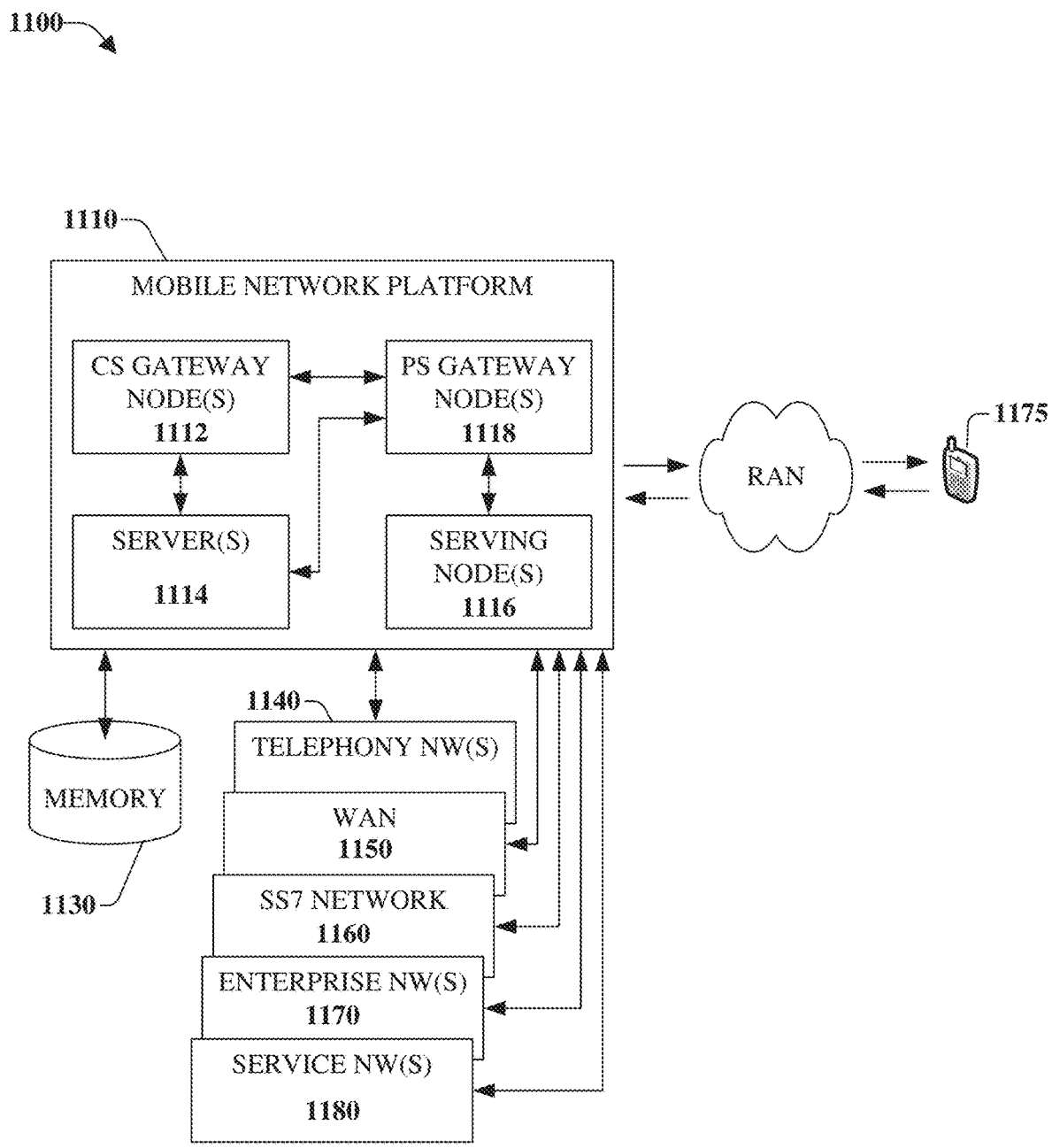
FIG. 11 illustrates an example block diagram of a non-limiting embodiment of a mobile network platform in accordance with various aspects described herein.

FIG. 11 presents an example embodiment 1100 of a mobile network platform 1110 that can implement and exploit one or more aspects of the disclosed subject matter described herein. Generally, wireless network platform 1110 can include components, e.g., nodes, gateways, interfaces, servers, or disparate platforms, that facilitate both packet-switched (PS) (e.g., Internet protocol (IP), frame relay, asynchronous transfer mode (ATM)) and circuit-switched (CS) traffic (e.g., voice and data), as well as control generation for networked wireless telecommunication. As a non-limiting example, wireless network platform 1110 can be included in telecommunications carrier networks, and can be considered carrier-side components as discussed elsewhere herein. Mobile network platform 1110 includes CS gateway node(s) 1112 which can interface CS traffic received from legacy networks such as telephony network(s) 1140 (e.g., public switched telephone network (PSTN), or public land mobile network (PLMN)) or a signaling system #7 (SS7) network 1160. Circuit switched gateway node(s) 1112 can authorize and authenticate traffic (e.g., voice) arising from such networks. Additionally, CS gateway node(s) 1112 can access mobility, or roaming, data generated through SS7 network 1160; for instance, mobility data stored in a visited location register (VLR), which can reside in memory 1130. Moreover, CS gateway node(s) 1112 interfaces CS-based traffic and signaling and PS gateway node(s) 1118. As an example, in a 3GPP UMTS network, CS gateway node(s) 1112 can be realized at least in part in gateway GPRS support node(s) (GGSN). It should be appreciated that functionality and specific operation of CS gateway node(s) 1112, PS gateway node(s) 1118, and serving node(s) 1116, is provided and dictated by radio technology(ies) utilized by mobile network platform 1110 for telecommunication. Mobile network platform 1110 can also include the MMEs, HSS/PCRFs, SGWs, and PGWs disclosed herein.

In addition to receiving and processing CS-switched traffic and signaling, PS gateway node(s) 1118 can authorize and authenticate PS-based data sessions with served mobile devices. Data sessions can include traffic, or content(s), exchanged with networks external to the wireless network platform 1110, like wide area network(s) (WANs) 1150, enterprise network(s) 1170, and service network(s) 1180, which can be embodied in local area network(s) (LANs), can also be interfaced with mobile network platform 1110 through PS gateway node(s) 1118. It is to be noted that WANs 1150 and enterprise network(s) 1170 can embody, at least in part, a service network(s) such as IP multimedia subsystem (IMS). Based on radio technology layer(s) available in technology resource(s) 1117, packet-switched gateway node(s) 1118 can generate packet data protocol contexts when a data session is established; other data structures that facilitate routing of packetized data also can be generated. To that end, in an aspect, PS gateway node(s) 1118 can include a tunnel interface (e.g., tunnel termination gateway (TTG) in 3GPP UMTS network(s) (not shown)) which can facilitate packetized communication with disparate wireless network(s), such as Wi-Fi networks.

In embodiment 1100, wireless network platform 1110 also includes serving node(s) 1116 that, based upon available radio technology layer(s) within technology resource(s) 1117, convey the various packetized flows of data streams received through PS gateway node(s) 1118. It is to be noted that for technology resource(s) 1117 that rely primarily on CS communication, server node(s) can deliver traffic without reliance on PS gateway node(s) 1118; for example, server node(s) can embody at least in part a mobile switching center. As an example, in a 3GPP UMTS network, serving node(s) 1116 can be embodied in serving GPRS support node(s) (SGSN).

For radio technologies that exploit packetized communication, server(s) 1114 in wireless network platform 1110 can execute numerous applications that can generate multiple disparate packetized data streams or flows, and manage (e.g., schedule, queue, format, and so on) such flows. Such application(s) can include add-on features to standard services (for example, provisioning, billing, user support, and so forth) provided by wireless network platform 1110. Data streams (e.g., content(s) that are part of a voice call or data session) can be conveyed to PS gateway node(s) 1118 for authorization/authentication and initiation of a data session, and to serving node(s) 1116 for communication thereafter. In addition to application server, server(s) 1114 can include utility server(s), a utility server can include a provisioning server, an operations and maintenance server, a security server that can implement at least in part a certificate authority and firewalls as well as other security mechanisms, and the like. In an aspect, security server(s) secure communication served through wireless network platform 1110 to ensure network's operation and data integrity in addition to authorization and authentication procedures that CS gateway node(s) 1112 and PS gateway node(s) 1118 can enact. Moreover, provisioning server(s) can provision services from external network(s) like networks operated by a disparate service provider; for instance, WAN 1150 or Global Positioning System (GPS) network(s) (not shown). Provisioning server(s) can also provision coverage through networks associated to wireless network platform 1110 (e.g., deployed and operated by the same service provider), such as femto-cell network(s) (not shown) that enhance wireless service coverage within indoor confined spaces and offload RAN resources in order to enhance subscriber service experience within a home or business environment by way of UE 1175.

It is to be noted that server(s) 1114 can include one or more processors configured to confer at least in part the functionality of macro network platform 1110. To that end, the one or more processor can execute code instructions stored in memory 1130, for example. It should be appreciated that server(s) 1114 can include a content manager 1115, which operates in substantially the same manner as described hereinbefore.

In example embodiment 1100, memory 1130 can store information related to operation of wireless network platform 1110. Other operational information can include provisioning information of mobile devices served through wireless network platform 1110, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 1130 can also store information from at least one of telephony network(s) 1140, WAN 1150, enterprise network(s) 1170, or SS7 network 1160. In an aspect, memory 1130 can be, for example, accessed as part of a data store component or as a remotely connected memory store.

Figure 12:
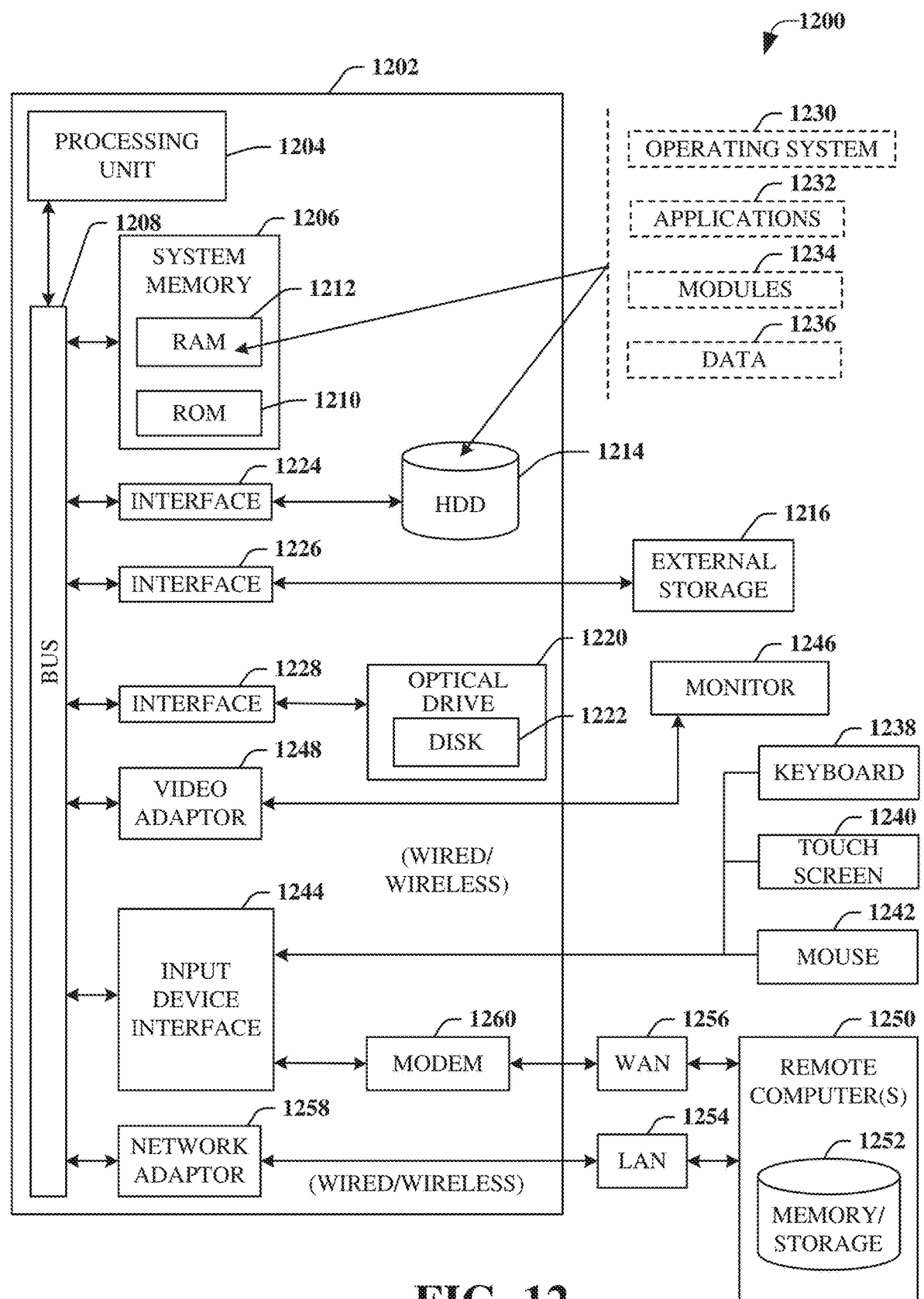
FIG. 12 illustrates an example block diagram of an example computer operable to engage in a system architecture that facilitates wireless communications according to one or more embodiments described herein.

In order to provide additional context for various embodiments described herein, FIG. 12 and the following discussion are intended to provide a brief, general description of a suitable computing environment 1200 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 12, the example environment 1200 for implementing various embodiments of the aspects described herein includes a computer 1202, the computer 1202 including a processing unit 1204, a system memory 1206 and a system bus 1208. The system bus 1208 couples system components including, but not limited to, the system memory 1206 to the processing unit 1204. The processing unit 1204 can be any of various commercially available processors. Dual microprocessors and other multi-processor architectures can also be employed as the processing unit 1204.

The system bus 1208 can be any of several types of bus structure that can further interconnect to a memory bus (with or without a memory controller), a peripheral bus, and a local bus using any of a variety of commercially available bus architectures. The system memory 1206 includes ROM 1210 and RAM 1212. A basic input/output system (BIOS) can be stored in a non-volatile memory such as ROM, erasable programmable read only memory (EPROM), EEPROM, which BIOS contains the basic routines that help to transfer information between elements within the computer 1202, such as during startup. The RAM 1212 can also include a high-speed RAM such as static RAM for caching data.

The computer 1202 further includes an internal hard disk drive (HDD) 1214 (e.g., EIDE, SATA), one or more external storage devices 1216 (e.g., a magnetic floppy disk drive (FDD) 1216, a memory stick or flash drive reader, a memory card reader, etc.) and an optical disk drive 1220 (e.g., which can read or write from a CD-ROM disc, a DVD, a BD, etc.). While the internal HDD 1214 is illustrated as located within the computer 1202, the internal HDD 1214 can also be configured for external use in a suitable chassis (not shown). Additionally, while not shown in environment 1200, a solid state drive (SSD) could be used in addition to, or in place of, an internal HDD 1214. The internal HDD 1214, external storage device(s) 1216 and optical disk drive 1220 can be connected to the system bus 1208 by an HDD interface 1224, an external storage interface 1226 and an optical drive interface 1228, respectively. The HDD interface 1224 for external drive implementations can include at least one or both of Universal Serial Bus (USB) and Institute of Electrical and Electronics Engineers (IEEE) 1294 interface technologies. Other external drive connection technologies are within contemplation of the embodiments described herein.

The drives and their associated computer-readable storage media provide nonvolatile storage of data, data structures, computer-executable instructions, and so forth. For the computer 1202, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1212, including an operating system 1230, one or more application programs 1232, other program modules 1234 and program data 1236. All or portions of the operating system, applications, modules, and/or data can also be cached in the RAM 1212. The systems and methods described herein can be implemented utilizing various commercially available operating systems or combinations of operating systems.

Computer 1202 can optionally comprise emulation technologies. For example, a hypervisor (not shown) or other intermediary can emulate a hardware environment for operating system 1230, and the emulated hardware can optionally be different from the hardware illustrated in FIG. 12. In such an embodiment, operating system 1230 can comprise one virtual machine (VM) of multiple VMs hosted at computer 1202. Furthermore, operating system 1230 can provide runtime environments, such as the Java runtime environment or the .NET framework, for application programs 1232. Runtime environments are consistent execution environments that allow application programs 1232 to run on any operating system that includes the runtime environment. Similarly, operating system 1230 can support containers, and application programs 1232 can be in the form of containers, which are lightweight, standalone, executable packages of software that include, e.g., code, runtime, system tools, system libraries and settings for an application.

Further, computer 1202 can be enable with a security module, such as a trusted processing module (TPM). For instance with a TPM, boot components hash next in time boot components, and wait for a match of results to secured values, before loading a next boot component. This process can take place at any layer in the code execution stack of computer 1202, e.g., applied at the application execution level or at the operating system (OS) kernel level, thereby enabling security at any level of code execution.

A user can enter commands and information into the computer 1202 through one or more wired/wireless input devices, e.g., a keyboard 1238, a touch screen 1240, and a pointing device, such as a mouse 1242. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1204 through an input device interface 1244 that can be coupled to the system bus 1208, but can be connected by other interfaces, such as a parallel port, an IEEE 1094 serial port, a game port, a USB port, an IR interface, a BLUETOOTH® interface, etc.

A monitor 1246 or other type of display device can be also connected to the system bus 1208 via an interface, such as a video adapter 1248. In addition to the monitor 1246, a computer typically includes other peripheral output devices (not shown), such as speakers, printers, etc.

The computer 1202 can operate in a networked environment using logical connections via wired and/or wireless communications to one or more remote computers, such as a remote computer(s) 1250. The remote computer(s) 1250 can be a workstation, a server computer, a router, a personal computer, portable computer, microprocessor-based entertainment appliance, a peer device or other common network node, and typically includes many or all of the elements described relative to the computer 1202, although, for purposes of brevity, only a memory/storage device 1252 is illustrated. The logical connections depicted include wired/wireless connectivity to a local area network (LAN) 1254 and/or larger networks, e.g., a wide area network (WAN) 1256. Such LAN and WAN networking environments are commonplace in offices and companies, and facilitate enterprise-wide computer networks, such as intranets, all of which can connect to a global communications network, e.g., the Internet.

When used in a LAN networking environment, the computer 1202 can be connected to the local network 1254 through a wired and/or wireless communication network interface or adapter 1258. The adapter 1258 can facilitate wired or wireless communication to the LAN 1254, which can also include a wireless access point (AP) disposed thereon for communicating with the adapter 1258 in a wireless mode.

When used in a WAN networking environment, the computer 1202 can include a modem 1260 or can be connected to a communications server on the WAN 1256 via other means for establishing communications over the WAN 1256, such as by way of the Internet. The modem 1260, which can be internal or external and a wired or wireless device, can be connected to the system bus 1208 via the input device interface 1244. In a networked environment, program modules depicted relative to the computer 1202 or portions thereof, can be stored in the remote memory/storage device 1252. It will be appreciated that the network connections shown are example and other means of establishing a communications link between the computers can be used.

When used in either a LAN or WAN networking environment, the computer 1202 can access cloud storage systems or other network-based storage systems in addition to, or in place of, external storage devices 1216 as described above. Generally, a connection between the computer 1202 and a cloud storage system can be established over a LAN 1254 or WAN 1256 e.g., by the adapter 1258 or modem 1260, respectively. Upon connecting the computer 1202 to an associated cloud storage system, the external storage interface 1226 can, with the aid of the adapter 1258 and/or modem 1260, manage storage provided by the cloud storage system as it would other types of external storage. For instance, the external storage interface 1226 can be configured to provide access to cloud storage sources as if those sources were physically connected to the computer 1202.

The computer 1202 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

An aspect of 5G, which differentiates from previous 4G systems, is the use of NR. NR architecture can be designed to support multiple deployment cases for independent configuration of resources used for RACH procedures. Since the NR can provide additional services than those provided by LTE, efficiencies can be generated by leveraging the pros and cons of LTE and NR to facilitate the interplay between LTE and NR, as discussed herein.

Reference throughout this specification to "one embodiment," or "an embodiment," means that a particular feature, structure, or characteristic described in connection with the embodiment is included in at least one embodiment. Thus, the appearances of the phrase "in one embodiment," "in one aspect," or "in an embodiment," in various places throughout this specification are not necessarily all referring to the same embodiment. Furthermore, the particular features, structures, or characteristics can be combined in any suitable manner in one or more embodiments.

As used in this disclosure, in some embodiments, the terms "component," "system," "interface," and the like are intended to refer to, or comprise, a computer-related entity or an entity related to an operational apparatus with one or more specific functionalities, wherein the entity can be either hardware, a combination of hardware and software, software, or software in execution, and/or firmware. As an example, a component can be, but is not limited to being, a process running on a processor, a processor, an object, an executable, a thread of execution, computer-executable instructions, a program, and/or a computer. By way of illustration and not limitation, both an application running on a server and the server can be a component.

One or more components can reside within a process and/or thread of execution and a component can be localized on one computer and/or distributed between two or more computers. In addition, these components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software application or firmware application executed by one or more processors, wherein the processor can be internal or external to the apparatus and can execute at least a part of the software or firmware application. As yet another example, a component can be an apparatus that provides specific functionality through electronic components without mechanical parts, the electronic components can comprise a processor therein to execute software or firmware that confer(s) at least in part the functionality of the electronic components. In an aspect, a component can emulate an electronic component via a virtual machine, e.g., within a cloud computing system. While various components have been illustrated as separate components, it will be appreciated that multiple components can be implemented as a single component, or a single component can be implemented as multiple components, without departing from example embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or." That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "mobile device equipment," "mobile station," "mobile," subscriber station," "access terminal," "terminal," "handset," "communication device," "mobile device" (and/or terms representing similar terminology) can refer to a wireless device utilized by a subscriber or mobile device of a wireless communication service to receive or convey data, control, voice, video, sound, gaming or substantially any data-stream or signaling-stream. The foregoing terms are utilized interchangeably herein and with reference to the related drawings. Likewise, the terms "access point (AP)," "Base Station (BS)," BS transceiver, BS device, cell site, cell site device, "Node B (NB)," "evolved Node B (eNode B)," "home Node B (HNB)" and the like, are utilized interchangeably in the application, and refer to a wireless network component or appliance that transmits and/or receives data, control, voice, video, sound, gaming or substantially any data-stream or signaling-stream from one or more subscriber stations. Data and signaling streams can be packetized or frame-based flows.

Furthermore, the terms "device," "communication device," "mobile device," "subscriber," "customer entity," "consumer," "customer entity," "entity" and the like are employed interchangeably throughout, unless context warrants particular distinctions among the terms. It should be appreciated that such terms can refer to human entities or automated components supported through artificial intelligence (e.g., a capacity to make inference based on complex mathematical formalisms), which can provide simulated vision, sound recognition and so forth.

Embodiments described herein can be exploited in substantially any wireless communication technology, comprising, but not limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Z-Wave, Zigbee and other 802.XX wireless technologies and/or legacy telecommunication technologies.

The various aspects described herein can relate to New Radio (NR), which can be deployed as a standalone radio access technology or as a non-standalone radio access technology assisted by another radio access technology, such as Long Term Evolution (LTE), for example. It should be noted that although various aspects and embodiments have been described herein in the context of 5G, Universal Mobile Telecommunications System (UMTS), and/or Long Term Evolution (LTE), or other next generation networks, the disclosed aspects are not limited to 5G, a UMTS implementation, and/or an LTE implementation as the techniques can also be applied in 3G, 4G, or LTE systems. For example, aspects or features of the disclosed embodiments can be exploited in substantially any wireless communication technology. Such wireless communication technologies can include UMTS, Code Division Multiple Access (CDMA), Wi-Fi, Worldwide Interoperability for Microwave Access (WiMAX), General Packet Radio Service (GPRS), Enhanced GPRS, Third Generation Partnership Project (3GPP), LTE, Third Generation Partnership Project 2 (3GPP2) Ultra Mobile Broadband (UMB), High Speed Packet Access (HSPA), Evolved High Speed Packet Access (HSPA+), High-Speed Downlink Packet Access (HSDPA), High-Speed Uplink Packet Access (HSUPA), Zigbee, or another IEEE 802.XX technology. Additionally, substantially all aspects disclosed herein can be exploited in legacy telecommunication technologies.

As used herein, "5G" can also be referred to as NR access. Accordingly, systems, methods, and/or machine-readable storage media for facilitating link adaptation of downlink control channel for 5G systems are desired. As used herein, one or more aspects of a 5G network can comprise, but is not limited to, data rates of several tens of megabits per second (Mbps) supported for tens of thousands of users; at least one gigabit per second (Gbps) to be offered simultaneously to tens of users (e.g., tens of workers on the same office floor); several hundreds of thousands of simultaneous connections supported for massive sensor deployments; spectral efficiency significantly enhanced compared to 4G; improvement in coverage relative to 4G; signaling efficiency enhanced compared to 4G; and/or latency significantly reduced compared to LTE.

As used herein, the term "infer" or "inference" refers generally to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference can be employed to identify a specific context or action, or can generate a probability distribution over states of interest based on a consideration of data and events, for example.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification procedures and/or systems (e.g., support vector machines, neural networks, expert systems, Bayesian belief networks, fuzzy logic, and data fusion engines) can be employed in connection with performing automatic and/or inferred action in connection with the disclosed subject matter.

In addition, the various embodiments can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, machine-readable device, computer-readable carrier, computer-readable media, machine-readable media, computer-readable (or machine-readable) storage/communication media. For example, computer-readable media can comprise, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media. Of course, those skilled in the art will recognize many modifications can be made to this configuration without departing from the scope or spirit of the various embodiments The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the subject matter has been described herein in connection with various embodiments and corresponding figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:
   receiving, from a first network device by a second network device comprising a memory and a processor, a connection request that comprises an indication of a fall back procedure, wherein the connection request is associated with a mobile device via which a voice communication is scheduled to occur;

facilitating, by the second network device, control of the voice communication for the mobile device;

based on a determination that the voice communication has completed at the mobile device, triggering, by the second network device, a release of the control of the mobile device from the second network device; and redirecting, by the second network device, the mobile device to a third network device selected based on a capability of the mobile device.

2. The method of claim 1, wherein the receiving the indication of the fall back procedure comprises receiving an information element that comprises an evolved packet system return request.

3. The method of claim 2, wherein the information element is a first information element, and wherein the redirecting the mobile device to the third network device comprises receiving a second information element that comprises redirected carrier information.

4. The method of claim 1, further comprising:
prior to the triggering the release of the mobile device, evaluating, by the second network device, the capability of the mobile device based on the determination that the voice communication has completed at the mobile device.

5. The method of claim 4, wherein the evaluating the capability of the mobile device comprises determining the mobile device is able to support communication with a defined band on a standalone network.

6. The method of claim 1, wherein the determination is a first determination, and wherein the redirecting the mobile device to the third network device comprises:
determining that multiple advanced network bands are supported by the mobile device; and
selecting an advanced network band from the multiple advanced network bands based on a second determination that the advanced network band comprises a priority that satisfies a defined priority level as compared to other advanced network bands of the multiple advanced network bands other than the advanced network band.

7. The method of claim 1, wherein the triggering the release of the mobile device comprises evaluating an occurrence of a defined event.

8. The method of claim 7, wherein the defined event is the voice communication being a voice communication that originated from the first network device.

9. The method of claim 1, wherein the first network device is a network device configured to operate according to a fifth generation wireless network communication protocol.

10. The method of claim 1, wherein the second network device is deployed in a standalone deployment architecture.

11. The method of claim 10, wherein the first network device is a network device configured to operate according to a long term evolution network communication protocol.

12. The method of claim 1, wherein the connection request is a radio release control connection request.

13. The method of claim 1, wherein the first network device and the third network device are a same network device.

14. The method of claim 1, wherein the first network device and the third network device are different network devices.

15. A system, comprising:
a processor; and
a memory that stores executable instructions that, when executed by the processor, facilitate performance of operations, comprising:
controlling a first communication for a user equipment based on a connection request that comprises an indication of a fall back procedure, wherein the connection request is associated with the user equipment via which the first communication is scheduled to occur, and wherein the connection request is received from network equipment;
based on a determination that the first communication has completed at the user equipment, releasing a first control of the user equipment; and
redirecting the user equipment to the network equipment for a second control of a second communication scheduled to occur at the user equipment.

16. The system of claim 15, wherein the indication comprises a first information element that comprises an evolved packet system return request, and wherein the redirecting the user equipment comprises receiving a second information element that comprises redirected carrier information.

17. The system of claim 15, wherein the operations further comprise:
prior to the releasing the control of the user equipment, evaluating a capability of the user equipment based on the determination that the first communication has completed at the user equipment, wherein the evaluating the capability comprises determining the user equipment is able to support communication with a defined band on a standalone network.

18. A non-transitory machine-readable storage medium, comprising executable instructions that, when executed by a processor, facilitate performance of the executable instructions, comprising:
determining a first communication of a mobile device is to be controlled by a first network device based on a connection request that comprises an indication of a fall back procedure;
facilitating a control of the first communication by the first network device for a duration of the first communication;
based on a determination that the first communication has completed at the mobile device, facilitating a release of the control of the mobile device by the first network device; and
transferring the control of the mobile device to a second network device based on a capacity of the mobile device.

19. The non-transitory machine-readable storage medium of claim 18, wherein the determination is a first determination, and wherein the transferring the control of the mobile device to the second network device comprises:
determining that multiple advanced network bands are supported by the mobile device; and
selecting an advanced network band from the multiple advanced network bands based on a second determination that the advanced network band comprises a priority that satisfies a defined priority level as compared to other advanced network bands of the multiple advanced network bands other than the advanced network band.

20. The non-transitory machine-readable storage medium of claim 18, wherein the indication comprises a first information element that comprises an evolved packet system return request, and wherein the redirecting the mobile device comprises receiving a second information element that comprises redirected carrier information.

\* \* \* \* \*